United States Patent
Zhang et al.

(10) Patent No.: US 7,578,068 B2
(45) Date of Patent: Aug. 25, 2009

(54) DETECTING APPARATUS FOR WORKPIECE

(75) Inventors: Bing-Jun Zhang, Shenzhen (CN); Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 110 days.

(21) Appl. No.: 11/829,097

(22) Filed: Jul. 27, 2007

(65) Prior Publication Data
US 2008/0235968 A1    Oct. 2, 2008

(30) Foreign Application Priority Data
Apr. 2, 2007    (CN) .................. 2007 1 0200379

(51) Int. Cl.
*G01B 11/02*    (2006.01)
(52) U.S. Cl. .................. 33/501.6; 33/1 V; 33/1 BB; 356/625; 356/635; 356/634; 250/559.24; 250/559.19; 250/559.2
(58) Field of Classification Search ............ 33/501.6, 33/1 V, 1 BB; 356/625, 627, 635, 634; 250/559.24, 250/559.19, 559.2, 559.21, 559.26
See application file for complete search history.

(56) References Cited

U.S. PATENT DOCUMENTS

| | | | | |
|---|---|---|---|---|
| 2,708,368 | A * | 5/1955 | Kolisch ................ 73/865 |
| 4,176,460 | A * | 12/1979 | Kaye ................... 33/504 |
| 4,905,512 | A * | 3/1990 | Hayashi ................ 73/169 |
| 5,266,810 | A * | 11/1993 | Murphy ............. 250/559.24 |
| 5,331,118 | A * | 7/1994 | Jensen ............... 177/25.14 |
| 5,528,517 | A * | 6/1996 | Loken ................. 702/156 |
| 5,878,379 | A * | 3/1999 | Dlugos et al. .......... 702/156 |
| 5,914,464 | A * | 6/1999 | Vogel ................. 177/145 |
| 6,189,223 | B1 * | 2/2001 | Haug .................. 33/1 V |
| 6,549,293 | B2 * | 4/2003 | Hofman ................ 356/635 |
| 6,850,464 | B2 * | 2/2005 | Carlsruh et al. ......... 367/99 |
| 7,126,144 | B2 * | 10/2006 | De Coi .............. 250/559.12 |
| 7,373,722 | B2 * | 5/2008 | Cooper et al. ........... 33/1 V |

* cited by examiner

*Primary Examiner*—Christopher W Fulton
(74) *Attorney, Agent, or Firm*—Frank R. Niranjan

(57) ABSTRACT

A detecting apparatus includes a detecting plate, a controlling box, and an indicator installed on the detecting plate. A region is defined on one face of the detecting plate, for supporting a workpiece thereon, with an edge of the workpiece abutting against one side of the region. A first slot and a second slot are defined in the detecting plate on an opposite side of the region. The controlling box having a circuit board with a processor is installed on an opposite face of the detecting plate. Two light sensors are installed on the circuit board aligning with the first and second slots of the detecting plate respectively. The indicator is electrically connected with the light sensors and controlled by the processor, for showing whether the dimension of the workpiece is eligible, according to detection by the light sensors.

16 Claims, 4 Drawing Sheets

US 7,578,068 B2

DETECTING APPARATUS FOR WORKPIECE

BACKGROUND

1. Field of the Invention

The present invention relates to detecting apparatuses, and more particularly to a detecting apparatus for detecting whether a dimension of a workpiece matches a specification.

2. Description of Related Art

Typically, whether a dimension of a workpiece matches a specification is detected by a ruler or other measuring device. However, in a volume production process, a great deal of laminate material is difficult to measure accurately and quickly, and the laminate material may be scraped or bent by the measuring device used.

What is needed, therefore, is a detecting apparatus which is able to quickly and safely detect a dimension of a workpiece.

SUMMARY

An exemplary detecting apparatus includes a detecting plate, a controlling box, and an indicator installed on the detecting plate. A region is defined on one face of the detecting plate, for supporting a workpiece thereon, with an edge of the workpiece abutting against one side of the region. A first slot and a second slot are defined in the detecting plate on an opposite side of the region. The controlling box having a circuit board with a processor is installed on an opposite face of the detecting plate. Two light sensors are installed on the circuit board aligning with the first and second slots of the detecting plate respectively. The indicator is electrically connected with the light sensors and controlled by the processor, for showing whether the dimension of the workpiece is eligible, according to detection by the light sensors.

Other advantages and novel features will become more apparent from the following detailed description of preferred embodiments when taken in conjunction with the accompanying drawings, in which:

DETAILED DESCRIPTION

Figure 1:
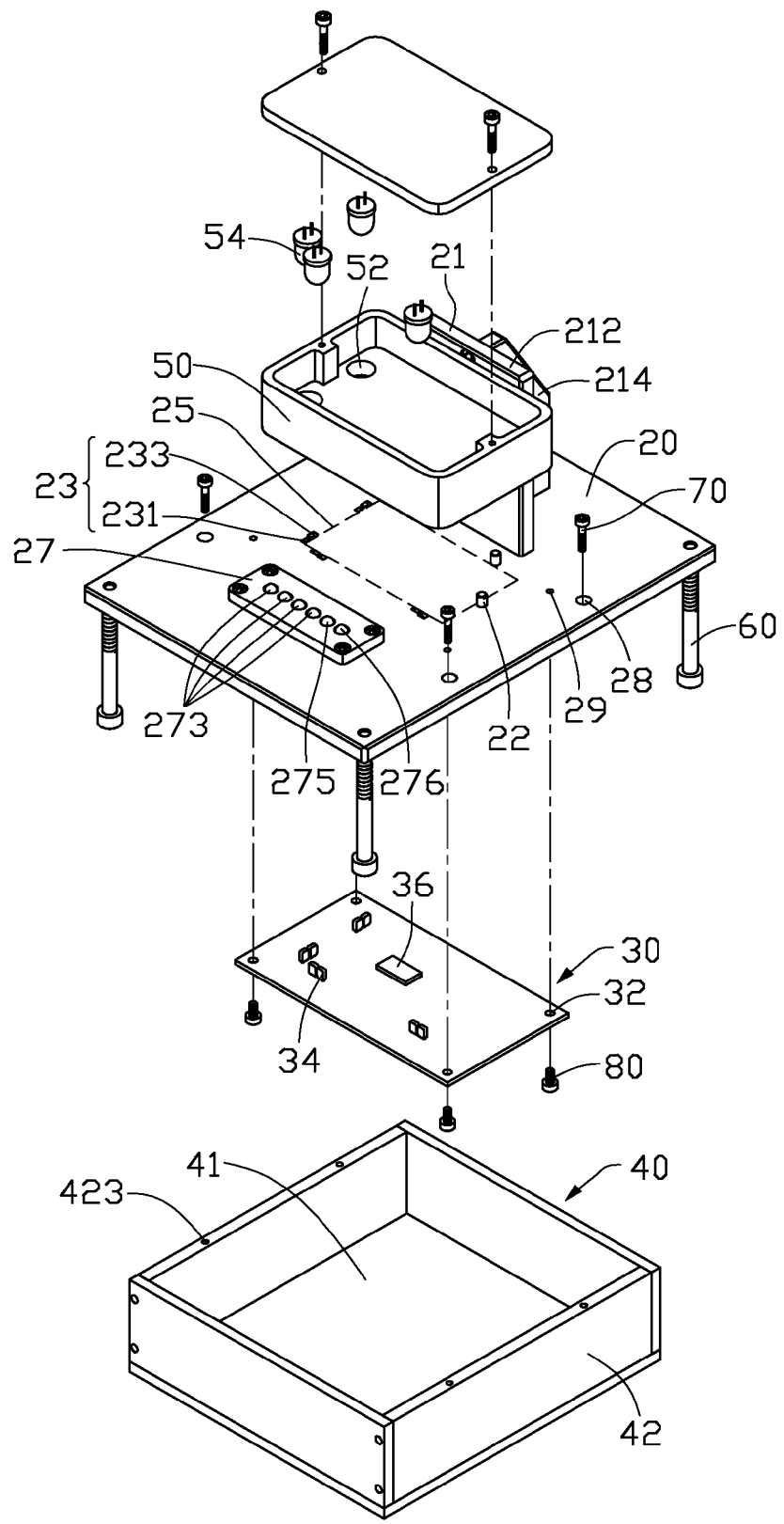
FIG. 1 is an exploded, isometric view of a detecting apparatus in accordance with an embodiment of the present invention, the detecting apparatus includes a detecting plate.
Figure 2:
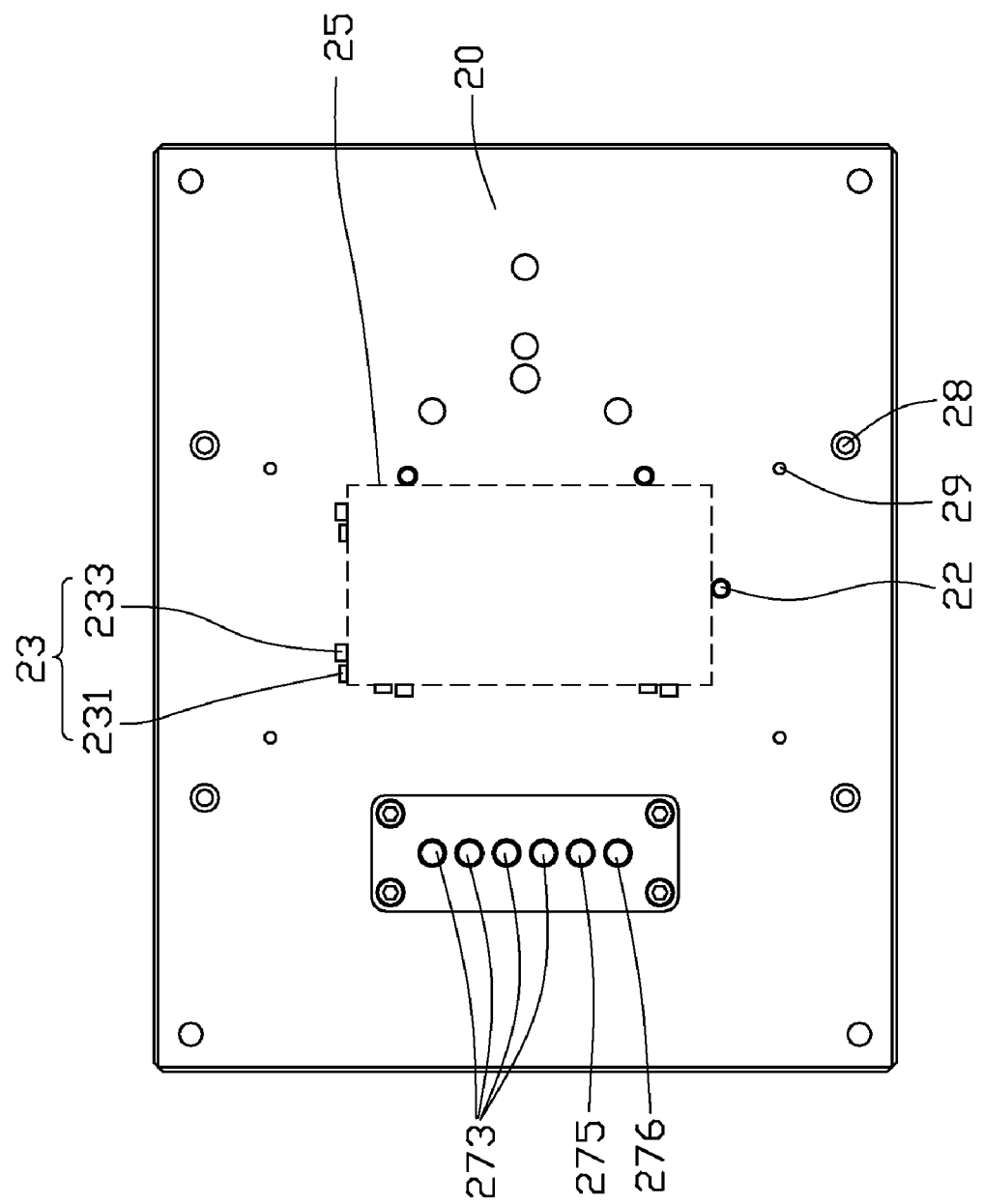
FIG. 2 is a top plan view of a part of the detecting plate of FIG. 1.
Figure 4:
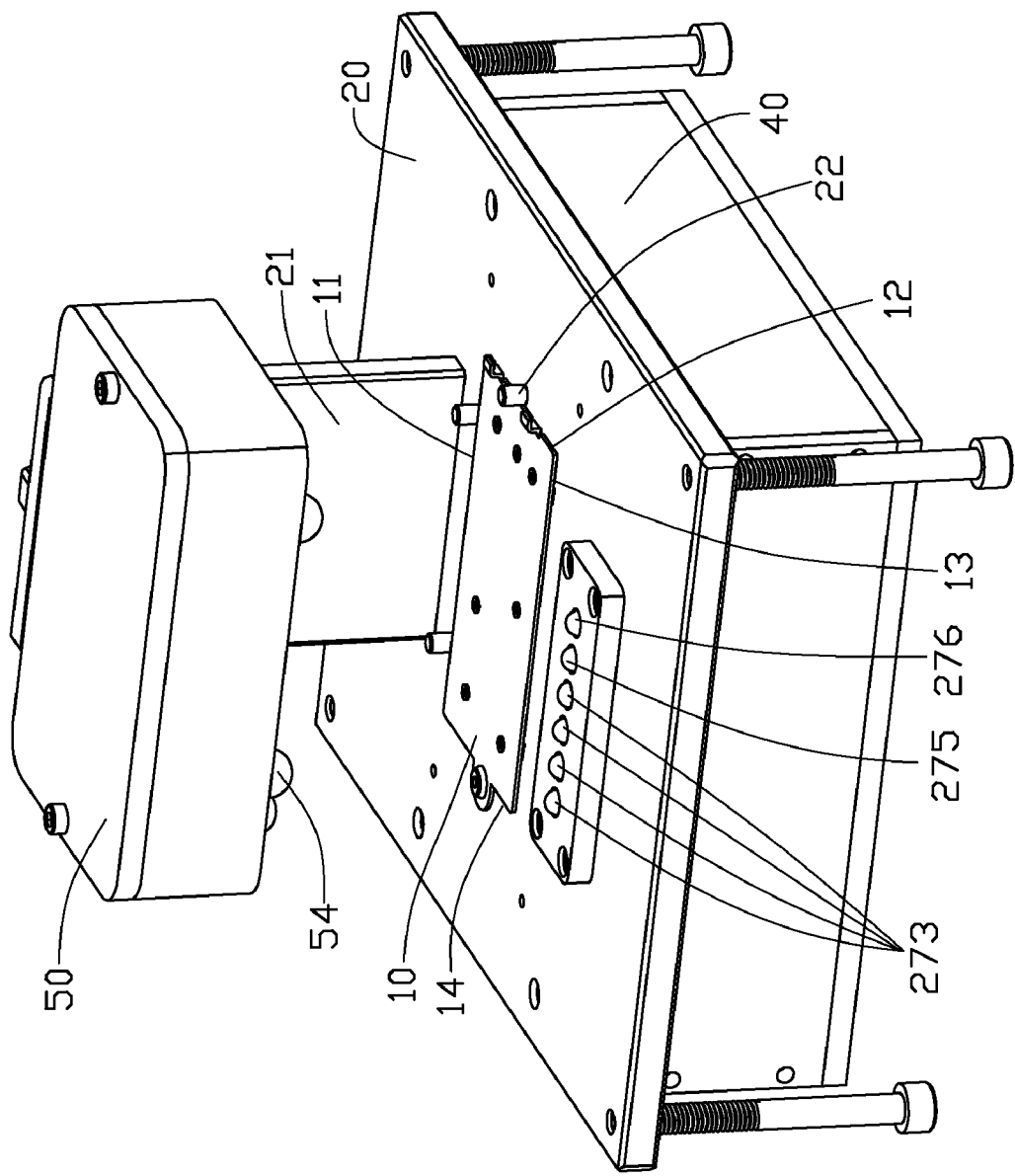
FIG. 4 is similar to FIG. 3, but showing a workpiece being detected.

Referring to FIGS. 1 and 2, a detecting apparatus is provided in accordance with an embodiment of the present invention for detecting whether a dimension of a workpiece matches a specification. The detecting apparatus includes a detecting plate 20, an indicator 27, a controlling box 40 having a circuit board 30 installed therein, and a lamp box 50. In this embodiment, the workpiece is a thin rectangular plate 10, as shown in FIG. 4.

The detecting plate 20 is supported by four feet 60. A rectangular region 25 bounded by three positioning posts 22 and four groups of slots 23 is defined on a middle section of the detecting plate 20. Two of the positioning posts 22 are adjacent to a first side of the rectangular region 25, and the other one of the positioning posts 22 is adjacent to a second side of the rectangular region 25 perpendicular to the first side. Two groups of the slots 23 are defined adjacent to a third side of the rectangular region 25 parallel to the first side, and the other two groups of the slots 23 are defined adjacent to a fourth side of the rectangular region 25 parallel to the second side. An area of the rectangular region 25 is smaller than an area of the plate 10. Each group of the slots 23 includes a first rectangular slot 231, and a second rectangular slot 233 adjacent to the first rectangular slot 231. Each of the first rectangular slot 231 and the second rectangular slot 233 includes a first edge adjoining the corresponding third side or fourth side of the rectangular region 25, and a second edge parallel to the first edge. A vertical distance between the second edges of the first rectangular slot 231 and the second rectangular slot 233 of each group of the slots 23 is defined to be equal to a length tolerance or a width tolerance of the plate 10. A vertical distance between the second edge of each first rectangular slot 231 and the first side or the second side of the rectangular region 25 opposite to the first rectangular slot 231 is a minimum eligible length or width of the plate 10. A vertical distance between the second edge of each second rectangular slot 233 and the first side or the second side of the rectangular region 25 opposite to the second rectangular slot 233 is a maximum eligible length or width of the plate 10. Two spaced fixing holes 28 are defined in the detecting plate 20 adjacent to each of two opposite edges thereof. Four through holes 29 are defined in the detecting plate 20 adjacent to four outer corners of the rectangular region 25 respectively.

The indicator 27 is installed on the detecting plate 20. The indicator 27 includes four sensor indicating lights 273, a power indicating light 276, and a result indicating light 275 for showing whether the dimension of the plate 10 is eligible.

The circuit board 30 defines four through holes 32 adjacent to four corners thereof. Four pairs of light sensors 34 are installed on the circuit board 30 corresponding to the slots 23 of the detecting plate 20. In this embodiment, the light sensors 34 are photoresistors.

The controlling box 40 includes a bottom wall 41 and four sidewalls 42. A top portion of each of two opposite sidewalls 42 defines two spaced fixing holes 423, and there is a power source accommodated within the controlling box 40.

The lamp box 50 is installed on a bracket 21, such as the bracket 21 formed by two plates 212, 214 connected perpendicularly to each other and extending up perpendicularly from the detecting plate 20. Four apertures 52 are defined in a bottom plate of the lamp box 50, corresponding to the slots 23 of the detecting plate 20. Four lamps 54 are installed in the lamp box 50 aligning with the apertures 52 respectively.

Figure 3:
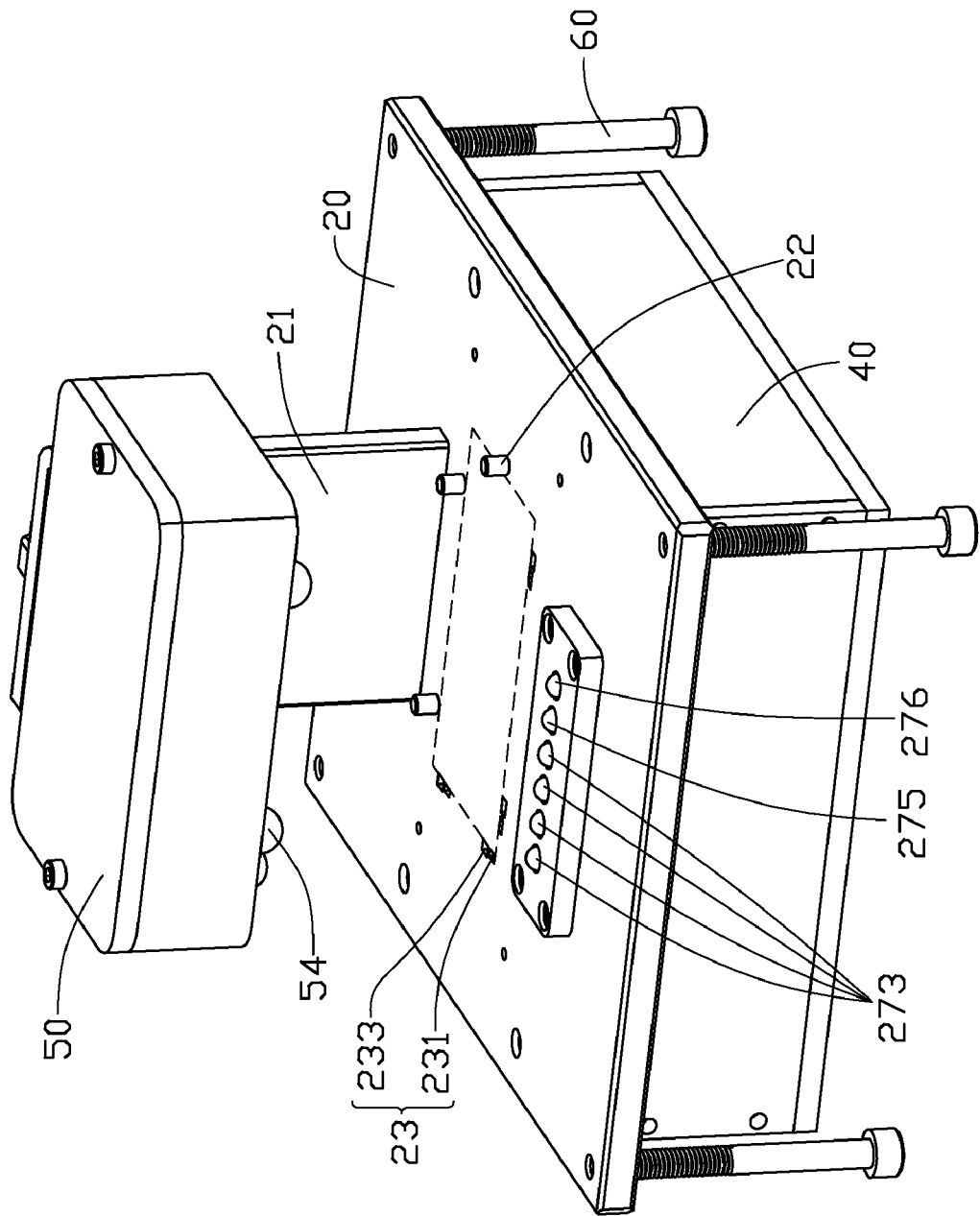
FIG. 3 is an assembled view of FIG.1.

Referring to FIG. 3, in assembly, four screws 80 are extended through the through holes 32 from under the circuit board 30 respectively, and are screwed into the corresponding through holes 29 of the detecting plate 20. Thereby, the circuit board 30 is fixed to a bottom of the detecting plate 20. Each pair of the light sensors 34 of the circuit board 30 align with the corresponding first rectangular slot 231 and second rectangular slot 233 of the detecting plate 20, for receiving light emitted by the lamps 54. A processor 36 is installed on the circuit board 30. The light sensors 34 of the circuit board 30 are electrically connected with the processor 36, and further electrically connected with the sensor indicating lights 273 of the detecting plate 20 respectively. The processor 36 can collect and handle status messages of the light sensors 34 and control the corresponding sensor indicating lights 273 and the result indicating light 275. The controlling box 40 is placed under the detecting plate 20. Four screws 70 are extended through the fixing holes 28 of the detecting plate 20 respectively, and are screwed into the corresponding fixing holes 423 of the controlling box 40. Thereby, the controlling box 40 is fixed to the bottom of the detecting plate 20, and the circuit board 30 is received in the controlling box 40. The lamps 54 in the lamp box 50 are electrically connected with the controlling box 40 by a cable.

Referring further to FIG. 4, in use, power is supplied to the detecting apparatus, and the power indicating light 276 is lit. The light emitted by the lamps 54 of the lamp box 50 passes through the slots 23 of the detecting plate 20, and the light sensors 34 under the slots 23 sense the light and change the light to electrical signals. The processor 36 mounted on the circuit board 30 receives the electrical signals from the light sensors 34, and responsively controls the sensor indicating lights 273 on the detecting plate 20 to be lit. The plate 10 having four lateral sides 11, 12, 13, 14 is disposed on the rectangular region 25 of the detecting plate 20, and two adjacent lateral sides 11, 12 of the plate 10 abut against the positioning posts 22 of the detecting plate 20 respectively.

When the length or width of the plate 10 is equal to or greater than a maximum eligible length or width thereof, a portion of the plate 10 adjacent to the lateral side 13 or 14 of the plate 10 entirely shields the first rectangular slot 231 and the second rectangular slot 233 of the corresponding group of slots 23 of the detecting plate 20. The light sensors 34 below the entirely shielded first rectangular slot 231 and second rectangular slot 233 cannot sense the light emitted by the lamps 54, and the shielded light sensors 34 sense the changing of the light and send electrical signals to the processor 36. The processor 36 controls the corresponding sensor indicating lights 273 connected with the shielded light sensors 34 on the detecting plate 20 to be lit, indicating the dimension of the plate 10 above the corresponding group of slots 23 is unqualified.

When the length or width of the plate 10 is less than a minimum eligible length or width thereof, the portion of the plate 10 adjacent to the lateral side 13 or 14 of the plate 10 can't entirely shield the first rectangular slot 231 and the second rectangular slot 233 of the corresponding group of slots 23 of the detecting plate 20. The light sensors 34 below the unshielded first rectangular slot 231 and second rectangular slot 233 sense the light emitted by the lamps 54, and send electrical signals to the processor 36. The processor 36 controls the corresponding sensor indicating lights 273 connected with the unshielded light sensors 34 on the detecting plate 20 to be lit, indicating the dimension of the plate 10 above the corresponding group of slots 23 is unqualified.

When the length and width of the plate 10 are between the maximum and minimum eligible length and width thereof, the portion of the plate 10 adjacent to the lateral sides 13, 14 of the plate 10 entirely shields the first rectangular slots 231 of the corresponding groups of slots 23 of the detecting plate 20, but only partly shields the second rectangular slots 233 of the corresponding groups of slots 23 of the detecting plate 20. One of each pair of the light sensors 34 below the groups of slots 23, corresponding to the second rectangular slot 233, senses the light emitted by the lamps 54, and the other one of each pair of the light sensors 34 below the groups of slots 23, corresponding to the first rectangular slot 231, does not. Each pair of the light sensors 34 senses the changing of the light and sends electrical signals to the processor 36. The processor 36 controls the corresponding sensor indicating lights 273 not to be lit. When side portions of the plate 10 adjacent to the lateral sides 13, 14 entirely shield all of the first rectangular slots 231 and partly shield all of the second rectangular slots 233, all of the sensor indicating lights 273 are controlled not to be lit and the result indicating light 275 is controlled to be lit, indicating the dimension of the plate 10 is qualified.

In another embodiment, the first rectangular slot 231 and the second rectangular slot 233 of each group of the slots 23 may be replaced by a first circular hole and a second circular hole. Each of the first circular hole and the second circular hole has a point on an edge thereof which has the largest vertical distance to the corresponding third side or fourth side of the rectangular region 25. A distance between the points of the first circular hole and the second circular hole along a direction perpendicular to the corresponding third side or fourth side of the rectangular region 25 is defined to be equal to the length tolerance or the width tolerance of the plate 10.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A detecting apparatus for detecting whether a dimension of a workpiece matching a specification, the detecting apparatus comprising:

a detecting plate having a first face and a second face opposite to the first face, a region having two opposite sides defined on the first face of the detecting plate for supporting the workpiece thereon with one of the sides positioning an edge of the workpiece, a first slot and a second slot defined through the detecting plate outside of the region and adjoining the other one of the sides of the region;

a lamp installed on the first face of the detecting plate;

a controlling box installed on the second face of the detecting plate, a circuit board with a processor installed in the controlling box, two light sensors installed on the circuit board aligning with the first and second slots of the detecting plate respectively, for detecting whether light emitted by the lamp passes through the first and second slots; and at least one indicator installed on the detecting plate and controlled by the processor which is electrically connected with the light sensors, for showing whether the dimension of the workpiece is eligible, according to detection by the light sensors;

wherein each of the first and second slots comprises an edge away from the other one of the sides of the region, a vertical distance between the edges of the first and second slots is equal to a tolerance of the dimension of the workpiece.

2. The detecting apparatus as claimed in claim 1, wherein a shape of the region of the detecting plate is the same as the workpiece, and a size of the region is less than the workpiece.

3. The detecting apparatus as claimed in claim 1, wherein a bracket is formed on the first face of the detecting plate, for fixing the lamp above the first and second slots.

4. The detecting apparatus as claimed in claim 1, wherein the indicator includes at least one indicating light electrically connected with the circuit board.

5. The detecting apparatus as claimed in claim 1, wherein a positioning post is formed on the first face of the detecting plate outside of the region, and the positioning post adjoins the one of the sides of the region.

6. The detecting apparatus as claimed in claim 5, wherein the first and second slots are rectangular.

7. The detecting apparatus as claimed in claim 1, wherein the light sensors are photoresistors.

8. A detecting apparatus for detecting whether a dimension of a workpiece matching a specification, the detecting apparatus comprising:
- a detecting plate having a first face and a second face opposite to the first face, a region having two opposite sides defined on the first face of the detecting plate, for supporting the workpiece thereon, a positioning post formed on the first face outside of the region and adjoining one of the sides of the region for abutting an edge of the workpiece, a first slot and a second slot defined through the detecting plate on the other one of the sides of the region;
- a controlling box installed on the second face of the detecting plate, a circuit board installed in the controlling box, and two light sensors installed on the circuit board aligning with the first and second slots of the detecting plate respectively, for detecting whether there is light passing through the first and second slots; and
- an indicator installed on the detecting plate electrically connected with the light sensors, for showing whether the dimension of the workpiece is eligible, according to detection by the light sensors;
- wherein each of the first and second slots comprises an edge outside of and away from the other one of the sides of the region, a vertical distance between the edges of the first and second slots is equal to a tolerance of the dimension of the workpiece.

9. The detecting apparatus as claimed in claim 8, wherein a shape of the region of the detecting plate is the same as the workpiece, and a size of the region is less than the workpiece.

10. The detecting apparatus as claimed in claim 8, wherein a bracket is formed on the first face of the detecting plate, and a lamp is fixed on the bracket.

11. The detecting apparatus as claimed in claim 8, wherein the indicator includes at least one indicating light electrically connected with the circuit board.

12. The detecting apparatus as claimed in claim 8, wherein the first and second slots are rectangles.

13. The detecting apparatus as claimed in claim 8, wherein the light sensors are photoresistors.

14. A detecting apparatus for detecting whether a dimension of a workpiece matching a specification, the detecting apparatus comprising:
- a detecting plate having a first face and a second face opposite to the first face, a region with two opposite sides defined on the first face of the detecting plate configured for supporting the workpiece thereon, a positioning structure formed on the first face outside of the region and adjoining one of the sides of the region for positioning an edge of the workpiece, a plurality of groups of slots each comprising a first slot and a second slot defined through the detecting plate outside of the region and adjoining the other one of the sides of the region, the first and second slots having different sizes in a direction perpendicular to the other one of the sides of the region;
- an illuminating device installed above the first face of the detecting plate for emitting light to the slots;
- a circuit board mounted on the second face of the detecting plate, a plurality of pairs of light sensors installed on the circuit board and each aligning with a corresponding one of the first and second slots, for detecting whether there is light passing through the first and second slots, a processor being installed on the circuit board and communicating with the light sensors; and
- an indicator installed on the detecting plate and electrically connected with the processor, the indicator comprising a plurality of sensor indicating lights each corresponding to a group of the slots and being designed to be switched off when the workpiece entirely shield one of the group of the slots and partly shield the other one of the group of the slots, and a result indicating light designed to be switched on when all of the sensor indicating lights are controlled to be switched off, thereby indicating the dimension of the workpiece being qualified.

15. The detecting apparatus as claimed in claim 14, wherein the positioning structure comprises a plurality of positioning posts extending from the first face of the detecting plate configured to abut against the edge of the workpiece.

16. The detecting apparatus as claimed in claim 14, wherein the illuminating device comprises a plurality of lamps each located above a corresponding group of the slots.

* * * * *